United States Patent

Shiraishi et al.

(10) Patent No.: US 9,194,434 B2
(45) Date of Patent: Nov. 24, 2015

(54) SPINDLE MOTOR AND DISK DRIVE APPARATUS

(71) Applicant: Nidec Corporation, Kyoto (JP)

(72) Inventors: Masahiro Shiraishi, Kyoto (JP);
Tsuchitsugu Watanabe, Kyoto (JP);
Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/459,467

(22) Filed: Aug. 14, 2014

(65) Prior Publication Data

US 2015/0070798 A1  Mar. 12, 2015

(30) Foreign Application Priority Data

Sep. 10, 2013 (JP) ................................. 2013-186973

(51) Int. Cl.
*F16C 33/72* (2006.01)
*F16C 33/74* (2006.01)
*G11B 19/20* (2006.01)
*F16C 17/10* (2006.01)
*H02K 7/08* (2006.01)

(52) U.S. Cl.
CPC .............. *F16C 33/72* (2013.01); *F16C 17/107* (2013.01); *F16C 33/726* (2013.01); *F16C 33/74* (2013.01); *F16C 33/745* (2013.01); *G11B 19/2036* (2013.01); *F16C 33/741* (2013.01); *F16C 33/743* (2013.01); *H02K 7/08* (2013.01); *H02K 7/085* (2013.01)

(58) Field of Classification Search
None
See application file for complete search history.

(56) References Cited

U.S. PATENT DOCUMENTS

| 4,562,499 | A | 12/1985 | Mizoshita |
| 5,909,339 | A | 6/1999 | Hong |
| 8,858,084 | B2* | 10/2014 | Sugiki ............................. 384/114 |
| 2002/0071204 | A1 | 6/2002 | Nii et al. |
| 2012/0033329 | A1 | 2/2012 | Mizukami et al. |
| 2012/0212092 | A1* | 8/2012 | Goto et al. ....................... 310/90 |
| 2013/0058603 | A1* | 3/2013 | Kim ............................... 384/241 |

FOREIGN PATENT DOCUMENTS

| JP | 3-16080 A | 1/1991 |
| JP | 4-75446 A | 3/1992 |
| JP | 10-55605 A | 2/1998 |
| JP | 10-69753 A | 3/1998 |
| JP | 2003-331493 A | 11/2003 |

* cited by examiner

*Primary Examiner* — Wayne Young
*Assistant Examiner* — Carlos E Garcia
(74) *Attorney, Agent, or Firm* — Keating & Bennett, LLP

(57) ABSTRACT

A spindle motor is configured to rotate a disk in a case defined by a base plate and a top cover arranged to cover an upper side of the base plate. The spindle motor includes a fluid dynamic bearing including a lubricant oil. A rotating portion body of the spindle motor includes an air hole. An upper opening of the air hole is in communication with an annular space between the top cover and the rotating portion body. A lower opening of the air hole is in communication with a gap between a stator and a magnet. Accordingly, even if a gas including the lubricant oil vaporized through a liquid surface of the lubricant oil leaks into the annular space, at least a portion of the gas including the lubricant oil flows into the air hole.

16 Claims, 17 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to produce a torque by magnetic flux generated between a stator and a magnet, whereby the rotating portion is caused to rotate with respect to the stationary portion.

The stationary portion and the rotating portion of the spindle motor are joined to each other through a fluid dynamic bearing. A known spindle motor including a fluid dynamic bearing is described, for example, in US 2012/0033329. The spindle motor described in US 2012/0033329 includes a bearing mechanism including a lubricant oil (see paragraph [0047] and FIG. 3 of US 2012/0033329).

In the spindle motor as described above, once a lubricant oil vaporizes through a liquid surface of the lubricant oil, a gas including the lubricant oil is caused by a centrifugal force to flow radially outward along a surface of the rotating portion. Once the gas flows radially outward along the surface of the rotating portion, a component of the lubricant oil included in the gas may be adhered to a surface of a disk to cause an error in reading or writing of information from or to the disk.

The spindle motor described in US 2012/0033329 includes an annular axially extending gap having a locally decreased radial width between a radially inner edge of a seal cap and an inner cylindrical surface of an upper thrust portion (see paragraph [0077] and FIG. 8 of US 2012/0033329). This structure reduces the likelihood that the gas including the lubricant oil vaporized through the liquid surface of the lubricant oil will leak out of the bearing mechanism.

However, a further improvement in storage density of the disk requires that the reading and the writing of information from or to the disk should be performed with higher precision. This in turn makes it necessary to prevent a gas including even a little lubricant oil which has leaked out of the bearing mechanism from being adhered to the disk.

SUMMARY OF THE INVENTION

A spindle motor according to a preferred embodiment of the present invention is preferably used in a disk drive apparatus arranged to rotate a disk including a circular hole at a center thereof in a case including a base plate and a top cover arranged to cover an upper side of the base plate. The spindle motor includes a stationary portion, a rotating portion, a fluid dynamic bearing including a lubricant oil and arranged to support the rotating portion, and a seal portion connected with the fluid dynamic bearing, and including a liquid surface of the lubricant oil located therein. The stationary portion includes a shaft and a stator including a plurality of coils arranged in an annular shape. The rotating portion includes a rotating portion body and a magnet arranged opposite to the stator with a gap intervening therebetween. The rotating portion body includes a cylindrical first disk support surface and a disk-shaped second disk support surface arranged to extend radially outward from the first disk support surface. An annular space is arranged to intervene between the top cover and the rotating portion body inside the case. The annular space is arranged to be in communication with both the first disk support surface and the liquid surface. The rotating portion body further includes an air hole including an upper opening arranged to be in communication with the annular space, and a lower opening arranged to be in communication with the gap. The upper opening is arranged radially outward of the liquid surface and radially inward of the first disk support surface.

According to the spindle motor according to a preferred embodiment of the present invention, even if a gas including the lubricant oil vaporized through the liquid surface of the lubricant oil leaks into the annular space, at least a portion of the gas including the lubricant oil flows into the air hole. This contributes to preventing the gas including the lubricant oil from diffusing radially outwardly of the air hole. This in turn contributes to preventing a component of the lubricant oil from being adhered to the disk.

The above and other elements, features, steps, characteristics and advantages of the present invention will become more apparent from the following detailed description of the present preferred embodiments with reference to the attached drawings.

DETAILED DESCRIPTION OF THE PRESENT PREFERRED EMBODIMENTS

Hereinafter, preferred embodiments of the present invention and modifications thereof will be described with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that a vertical direction is an axial direction, and that a side on which a top cover is arranged with respect to a base plate is defined as an upper side. The shape of each member or portion and relative positions of different members or portions will be described based on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Also note that the wording "parallel direction" as used herein comprehends both parallel and substantially parallel directions. Also note that the wording "perpendicular direction" as used herein comprehends both perpendicular and substantially perpendicular directions.

Figure 1:
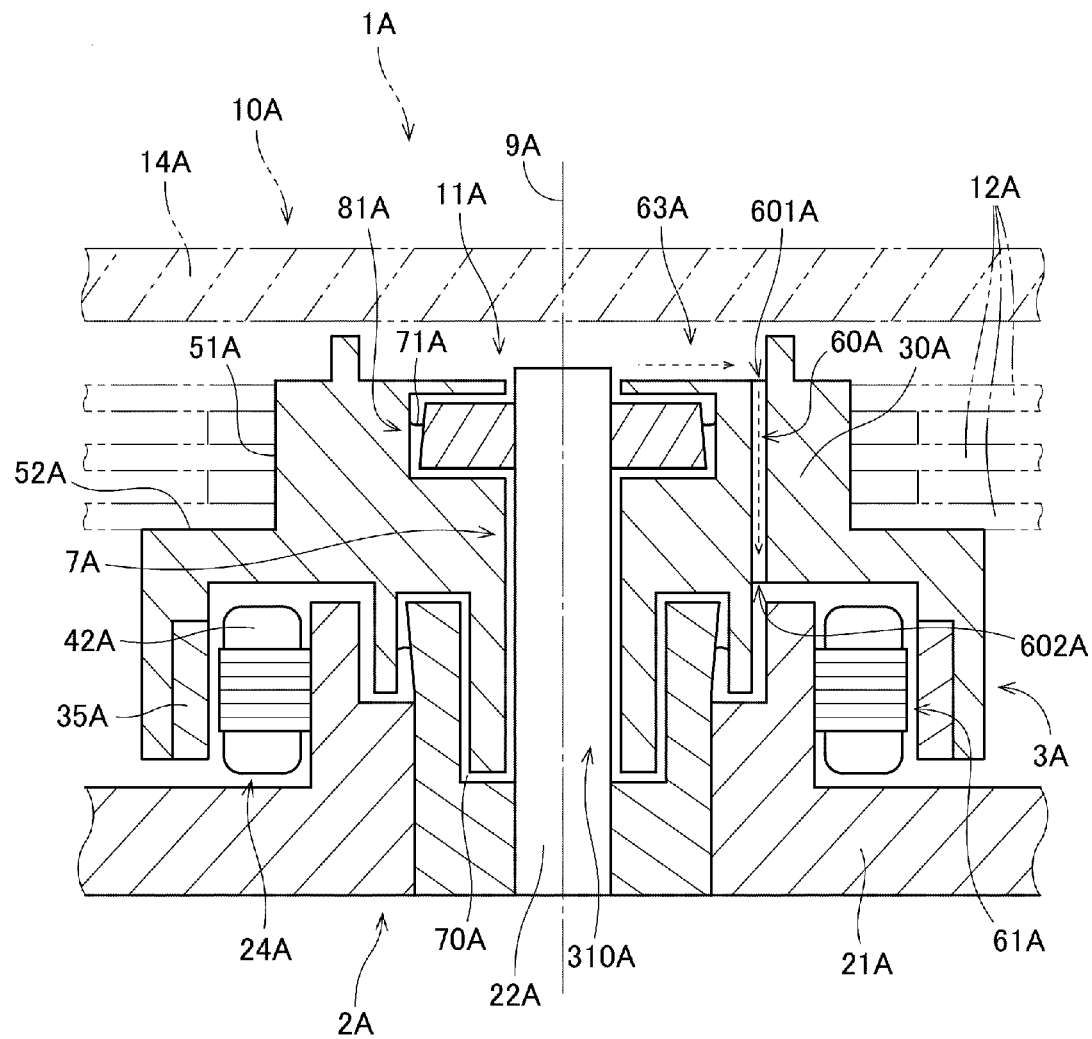
FIG. 1 is a schematic cross-sectional view of a spindle motor according to a first preferred embodiment of the present invention.

FIG. 1 is a schematic cross-sectional view of a spindle motor 11A according to a first preferred embodiment of the present invention. This spindle motor 11A is preferably used in a disk drive apparatus 1A. The disk drive apparatus 1A is arranged to rotate disks 12A inside a case 10A defined by a base plate 21A and a top cover 14A arranged to cover an upper side of the base plate 21A. Each disk 12A includes a circular hole at a center thereof. As illustrated in FIG. 1, the spindle motor 11A includes a stationary portion 2A and a rotating portion 3A arranged to be rotatable about a central axis 9A.

The stationary portion 2A preferably includes a shaft 22A and a stator 24A. The shaft 22A is arranged to extend along the central axis 9A. The stator 24A includes a plurality of coils 42A. The coils 42A are arranged in an annular shape with the central axis 9A as a center.

The rotating portion 3A preferably includes a rotating portion body 30A and a magnet 35A. The rotating portion body 30A includes a central through hole 310A. At least a portion of the shaft 22A is accommodated in the central through hole 310A. The rotating portion body 30A according to the present preferred embodiment is preferably defined by a single monolithic member. The magnet 35A is arranged opposite to the stator 24A with a gap 61A intervening therebetween.

The rotating portion body 30A preferably includes a cylindrical first disk support surface 51A and a disk-shaped second disk support surface 52A. The first disk support surface 51A is fitted in the circular holes of the disks 12A. The second disk support surface 52A is arranged to extend radially outward from the first disk support surface 51A. The lowest one of the disks 12A is mounted on the second disk support surface 52A.

The spindle motor 11A preferably includes further a seal portion 81A and a fluid dynamic bearing 7A including a lubricant oil 70A. The rotating portion 3A is rotatably supported by the fluid dynamic bearing 7A. The seal portion 81A is connected with the fluid dynamic bearing 7A. A liquid surface 71A of the lubricant oil 70A is located in the seal portion 81A.

An annular space 63A is arranged to intervene between the rotating portion body 30A and the top cover 14A inside the case 10A. The annular space 63A is arranged to be in communication with both the first disk support surface 51A and the liquid surface 71A. In addition, the rotating portion body 30A includes an air hole 60A. The air hole 60A preferably includes an upper opening 601A arranged to be in communication with the annular space 63A, and a lower opening 602A arranged to be in communication with the gap 61A. The upper opening 601A is arranged radially outward of the liquid surface 71A and radially inward of the first disk support surface 51A.

In this spindle motor 11A, if a gas including the lubricant oil 70A vaporized through the liquid surface 71A leaks into the annular space 63A, at least a portion of the gas including the lubricant oil 70A flows into the air hole 60A as indicated by a broken-line arrow in FIG. 1. This contributes to preventing the gas including the lubricant oil 70A from diffusing radially outwardly of the air hole 60A. This in turn contributes to preventing a component of the lubricant oil 70A from being adhered to any disk 12A.

Figure 2:
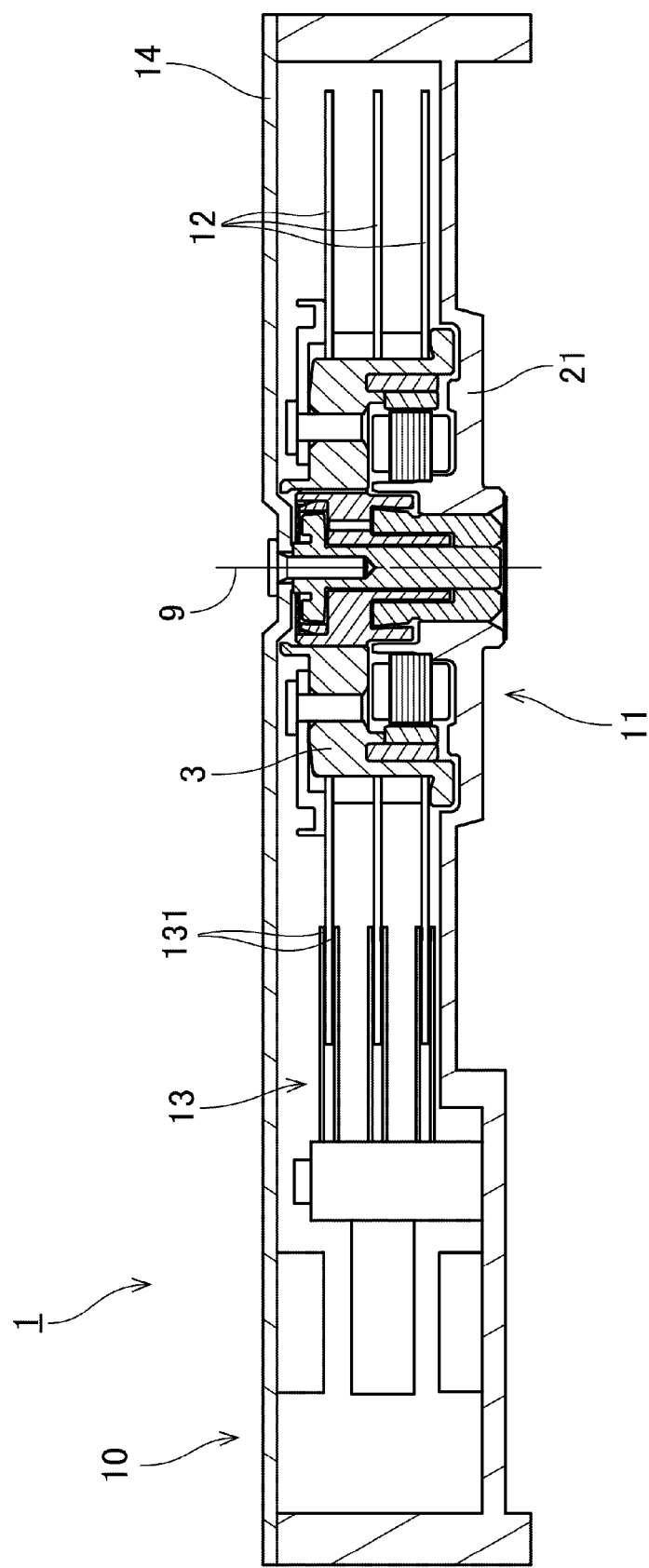
FIG. 2 is a schematic cross-sectional view of a disk drive apparatus according to a second preferred embodiment of the present invention.

FIG. 2 is a schematic cross-sectional view of a disk drive apparatus 1 in which a spindle motor 11 according to a second preferred embodiment of the present invention is installed. This disk drive apparatus 1 is arranged to rotate magnetic disks 12, each of which includes a circular hole at a center thereof, and is arranged to perform reading and writing of information from or to the magnetic disks 12. As illustrated in FIG. 2, the disk drive apparatus 1 preferably includes the spindle motor 11, the magnetic disks 12, which are preferably three in number, for example, an access portion 13, and a top cover 14.

The spindle motor 11 is arranged to rotate the three magnetic disks 12 about a central axis 9 while supporting the magnetic disks 12. The spindle motor 11 includes a base plate 21 arranged to extend in directions perpendicular to the central axis 9. An upper side of the base plate 21 is covered with the top cover 14. A rotating portion 3 of the spindle motor 11, the three magnetic disks 12, and the access portion 13 are preferably accommodated in a case 10 defined by the base plate 21 and the top cover 14. The access portion 13 is arranged to move heads 131 along recording surfaces of the magnetic disks 12 to perform the reading and writing of information from or to the magnetic disks 12.

Note that the number of magnetic disks 12 included in the disk drive apparatus 1 is not specifically limited and may be any of one, two, or more than three. Also note that the access portion 13 may alternatively be arranged to perform only one of the reading and the writing of information from or to the magnetic disks 12.

An interior space of the case 10 is preferably a clean space with no, or only extremely small amount of, dirt or dust. In the present preferred embodiment, the interior space of the case 10 is preferably filled with a clean air. Note, however, that the interior space of the case 10 according to a modification of the present preferred embodiment is filled with a helium gas, a hydrogen gas, or a nitrogen gas, for example, instead of the air. Also note that the interior space of the case 10 according to a modification of the present preferred embodiment is filled with a mixture of at least one of these gases and the air.

Figure 3:
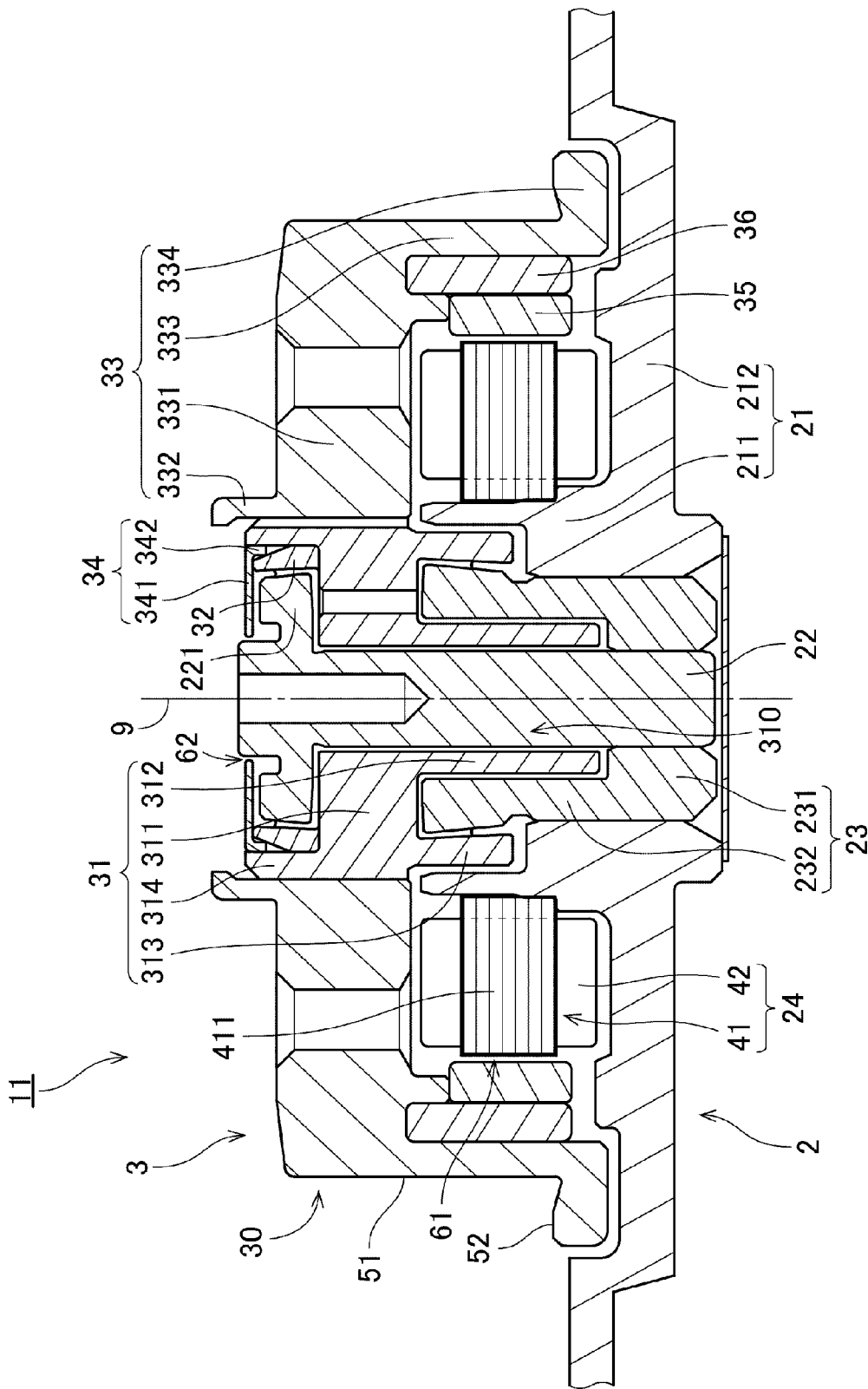
FIG. 3 is a schematic cross-sectional view of a spindle motor according to the second preferred embodiment of the present invention.

Next, the structure of the spindle motor 11 used in the disk drive apparatus 1 will now be described in detail below. FIG. 3 is a schematic cross-sectional view of the spindle motor 11. As illustrated in FIG. 3, the spindle motor 11 includes a stationary portion 2 and the rotating portion 3. The stationary portion 2 is arranged to be stationary relative to the case 10 of the disk drive apparatus 1. The rotating portion 3 is supported to be rotatable with respect to the stationary portion 2.

The stationary portion 2 according to the present preferred embodiment preferably includes the base plate 21, a shaft 22, a lower annular member 23, and a stator 24.

The base plate 21 is arranged to extend perpendicularly to the central axis 9 below the stator 24, a rotating portion body 30 (described below), a magnet 35 (described below), the magnetic disks 12, and the access portion 13. A metal, such as an aluminum alloy, for example, is preferably used as a material of the base plate 21. As illustrated in FIG. 3, the base plate 21 preferably includes a cylindrical holder portion 211 and a plate portion 212. The cylindrical holder portion 211 is arranged to extend in the axial direction to assume or substantially assume the shape of a cylinder radially inside the stator 24. The plate portion 212 is arranged to extend radially outward from the cylindrical holder portion 211.

The shaft 22 is arranged to extend along the central axis 9. A metal, such as stainless steel, for example, is preferably used as a material of the shaft 22. As illustrated in FIG. 2, an upper end portion of the shaft 22 is fixed to the top cover 14 of the disk drive apparatus 1. Meanwhile, a lower end portion of the shaft 22 is fixed to the cylindrical holder portion 211 of the base plate 21 through the lower annular member 23.

As illustrated in FIG. 3, the shaft 22 preferably includes an upper annular portion 221. The upper annular portion 221 is arranged to project radially outward in the vicinity of the upper end portion of the shaft 22. The upper annular portion 221 is arranged between an upper surface of an annular sleeve portion 311 described below and a lower surface of a cap plate portion 341 described below. The upper annular portion 221 according to the present preferred embodiment is preferably a portion of a member defining the shaft 22. Note, however, that the upper annular portion 221 and the shaft 22 according to other preferred embodiments may be provided by a combination of separate members.

The lower annular member 23 is preferably arranged below the upper annular portion 221, and is arranged to surround the shaft 22 in an annular shape. A metal, such as copper or brass, for example, is preferably used as a material of the lower annular member 23. The lower annular member 23 is fixed to the shaft 22 through press fitting, shrink fitting, an adhesive, or the like. Note, however, that the shaft 22 and the lower annular member 23 according to other preferred embodiments of the present invention are preferably defined by a single continuous monolithic member.

The lower annular member 23 according to the present preferred embodiment preferably includes a bottom portion 231 and a wall portion 232. The bottom portion 231 is arranged to extend in an annular shape below an inner tubular portion 312 of a sleeve 31 described below. An inner circumferential surface of the bottom portion 231 is fixed to an outer circumferential surface of the shaft 22. The wall portion 232 is arranged to extend upward from the bottom portion 231 to assume or substantially assume the shape of a cylinder radially outside the inner tubular portion 312. An outer circumferential surface of the wall portion 232 is fixed to an inner circumferential surface of the cylindrical holder portion 211.

The stator 24 includes a stator core 41 and a plurality of coils 42. The stator core 41 is preferably, for example, defined by laminated steel sheets, that is, electromagnetic steel sheets, such as silicon steel sheets, placed one upon another in the axial direction. The stator core 41 is fixed to an outer circumferential surface of the cylindrical holder portion 211. In addition, the stator core 41 includes a plurality of teeth 411 arranged to project radially outward. The coils 42 are a collection of conducting wires wound around the teeth 411. The teeth 411 and the coils 42 are arranged in an annular shape with the central axis 9 as a center.

The rotating portion 3 according to the present preferred embodiment preferably includes the sleeve 31, a sleeve aid member 32, a hub 33, a cap 34, the magnet 35, and a yoke 36.

The sleeve 31 is arranged to extend in the axial direction to assume a tubular shape around the shaft 22. A metal, such as stainless steel, aluminum, or copper, for example, is preferably used as a material of the sleeve 31. The sleeve 31 includes a central through hole 310 arranged to pass therethrough in the vertical direction. At least a portion of the shaft 22 is accommodated in the central through hole 310. The sleeve 31 according to the present preferred embodiment preferably includes the annular sleeve portion 311, the inner tubular portion 312, an outer tubular portion 313, and an upper tubular portion 314.

The annular sleeve portion 311 is arranged to surround the shaft 22 in an annular shape below the upper annular portion 221 and above the lower annular member 23. The inner tubular portion 312 is arranged to extend downward from a radially inner end portion of the annular sleeve portion 311 to assume the shape of a cylinder. The inner tubular portion 312 is arranged radially inward of the wall portion 232 of the lower annular member 23. The outer tubular portion 313 is arranged to extend downward from a vicinity of a radially outer end portion of the annular sleeve portion 311 to assume the shape of a cylinder. The outer tubular portion 313 is arranged radially outward of the wall portion 232 of the lower annular member 23. The upper tubular portion 314 is arranged to extend upward from the radially outer end portion of the annular sleeve portion 311 to assume the shape of a cylinder.

The sleeve aid member 32 is arranged above the annular sleeve portion 311 and radially inside the upper tubular portion 314. In the present preferred embodiment, the sleeve 31 and the sleeve aid member 32 are defined by separate members. The sleeve aid member 32 is fixed to the sleeve 31. The sleeve aid member 32 is arranged to surround the upper annular portion 221 of the shaft 22 in an annular shape. An inner circumferential surface of the sleeve aid member 32 and an outer circumferential surface of the upper annular portion 221 are arranged radially opposite each other with a gap intervening therebetween.

The hub 33 is arranged radially outside the sleeve 31. In the present preferred embodiment, the sleeve 31 and the hub 33 are preferably defined by separate members. The sleeve 31 is inserted radially inside the hub 33, and is fixed to the hub 33. The hub 33 preferably includes a top plate portion 331, a projecting portion 332, a hub tubular portion 333, and a flange portion 334. The top plate portion 331 is arranged to extend in an annular shape above the stator 24. The projecting portion 332 is arranged to extend upward from a radially inner end portion of the top plate portion 331 to assume the shape of a cylinder. The hub tubular portion 333 is arranged to extend downward from a radially outer end portion of the top plate portion 331 to assume a tubular shape. The flange portion 334 is arranged to extend farther radially outward from a lower end portion of the hub tubular portion 333.

A cylindrical outer circumferential surface 51 of the hub tubular portion 333 is fitted in the circular holes of the magnetic disks 12. An inner circumferential portion of each magnetic disk 12 is arranged to be in contact with at least a portion of the outer circumferential surface 51 of the hub tubular portion 333. The magnetic disk 12 is thus positioned radially. An upper surface 52 of the flange portion 334 is arranged to extend radially outward from the outer circumferential surface 51 of the hub tubular portion 333. A lower surface of the lowest one of the magnetic disks 12 is arranged to be in contact with at least a portion of the upper surface 52 of the flange portion 334. The magnetic disk 12 is thus positioned axially.

As described above, according to the present preferred embodiment, the outer circumferential surface 51 of the hub tubular portion 333 defines a first disk support surface, while the upper surface 52 of the flange portion 334 defines a second disk support surface. The three magnetic disks 12 are supported by these first and second disk support surfaces.

The cap 34 is preferably a disk-shaped or substantially disk-shaped member including a circular hole at a center thereof. The present preferred embodiment of the cap 34 is made of either a metal or a resin. The cap 34 according to the present preferred embodiment preferably includes the cap plate portion 341 and a cap projecting portion 342. The cap plate portion 341 is arranged to extend in an annular shape above the upper annular portion 221. An inner circumferential portion of the cap plate portion 341 is arranged radially opposite the outer circumferential surface of the shaft 22 in the vicinity of the upper end portion of the shaft 22 with a slight gap 62 intervening therebetween. The cap projecting portion 342 is arranged to project downward from a radially outer end portion of the cap plate portion 341 to assume or substantially assume the shape of a cylinder. The lower surface of the cap plate portion 341 is arranged to be in contact with an upper surface of the sleeve aid member 32. An outer circumferential surface of the cap projecting portion 342 is fixed to an inner circumferential surface of the upper tubular portion 314 of the sleeve 31 through, for example, an adhesive. Once the sleeve 31 starts rotating, the cap 34 is also caused to rotate together with the sleeve 31.

As described above, in the present preferred embodiment, the rotating portion body 30 preferably includes the sleeve 31, the sleeve aid member 32, the hub 33, and the cap 34. Note, however, that, of these four members which together define the rotating portion body 30, any two or more members could be defined together as a single monolithic member in accordance with a modification of the present preferred embodiments of the present invention. For example, the sleeve 31 and the sleeve aid member 32 could be defined by a single monolithic member. Also, the sleeve 31 and the hub 33 could be defined by a single monolithic member.

The magnet 35 is preferably arranged radially outside the stator 24. The magnet 35 is fixed to an inner circumferential surface of the hub tubular portion 333 through the yoke 36 made of a magnetic material. The magnet 35 according to the present preferred embodiment is annular in shape. A radially inner surface of the magnet 35 is arranged radially opposite a radially outer end surface of each of the teeth 411 with a slight gap 61 intervening therebetween. In addition, an inner circumferential surface of the magnet 35 preferably includes north and south poles arranged to alternate with each other in a circumferential direction.

Note that a plurality of magnets according to a modification of the preferred embodiments may be used in place of the annular magnet 35. In the case where the plurality of magnets are used, the magnets are arranged in the circumferential direction such that north and south poles alternate with each other.

Once drive currents are supplied to the coils 42 in the spindle motor 11 described above, magnetic flux is generated around each of the teeth 411. Then, interaction between the magnetic flux of the teeth 411 and that of the magnet 35 produces a circumferential torque between the stationary portion 2 and the rotating portion 3, so that the rotating portion 3 is caused to rotate about the central axis 9 with respect to the stationary portion 2. The magnetic disks 12 supported by the hub 33 are caused to rotate about the central axis 9 together with the rotating portion 3.

Figure 4:
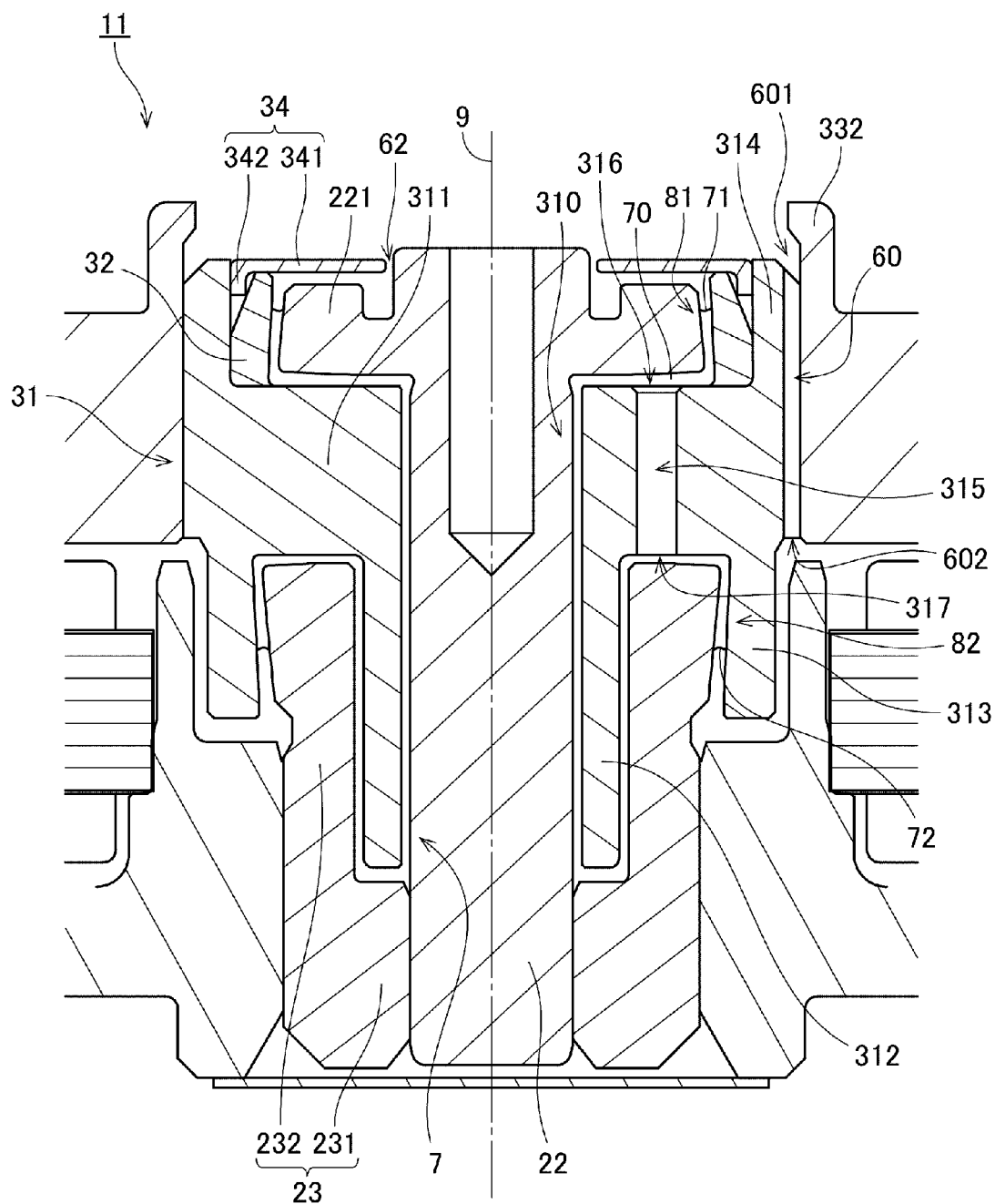
FIG. 4 is a schematic partial cross-sectional view of the spindle motor according to the second preferred embodiment of the present invention.

Next, the structure of a fluid dynamic bearing 7 included in the spindle motor 11 will now be described below. FIG. 4 is a schematic partial cross-sectional view of the spindle motor 11, illustrating the fluid dynamic bearing 7 and its vicinity. As illustrated in FIG. 4, a lubricant oil 70 is arranged to intervene between a combination of the shaft 22 and the lower annular member 23 and a combination of the sleeve 31 and the sleeve aid member 32. A polyolester oil or a diester oil, for example, is preferably used as the lubricant oil 70. The combination of the sleeve 31 and the sleeve aid member 32 is supported through the lubricant oil 70 to be rotatable with respect to the combination of the shaft 22 and the lower annular member 23.

That is, the fluid dynamic bearing 7 according to the present preferred embodiment is defined by the combination of the shaft 22 and the lower annular member 23, which are components of the stationary portion 2, the combination of the sleeve 31 and the sleeve aid member 32, which are components of the rotating portion 3, and the lubricant oil 70, which is arranged to intervene between the combination of the shaft 22 and the lower annular member 23 and the combination of the sleeve 31 and the sleeve aid member 32. The rotating portion 3 is rotatably supported through the fluid dynamic bearing 7.

Figure 5:
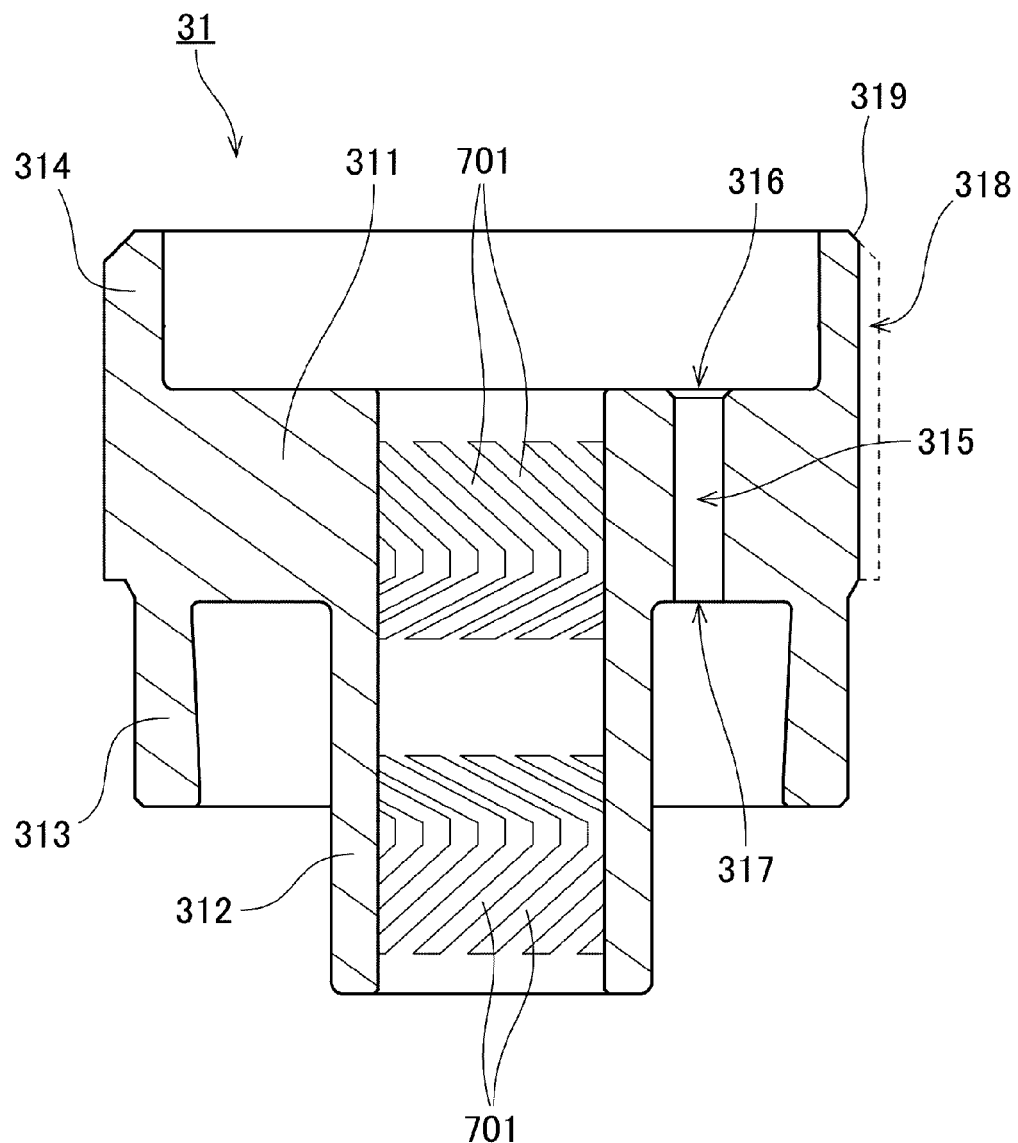
FIG. 5 is a schematic cross-sectional view of a sleeve according to the second preferred embodiment of the present invention.

FIG. 5 is a schematic cross-sectional view of the sleeve 31. As illustrated in FIG. 5, inner circumferential surfaces of the annular sleeve portion 311 and the inner tubular portion 312 preferably include upper and lower radial dynamic pressure groove arrays 701 each of which is arranged in a herringbone pattern. The sleeve 31 is arranged to rotate in one direction with respect to the shaft 22 while the spindle motor 11 is running. At this time, the upper and lower radial dynamic pressure groove arrays 701 induce a dynamic pressure in a portion of the lubricant oil 70 which is present between the shaft 22 and the sleeve 31. The sleeve 31 is thus supported radially with respect to the shaft 22. Note that it is enough that the upper and lower radial dynamic pressure groove arrays 701 should be defined in at least one of the outer circumferential surface of the shaft 22 and an inner circumferential surface of the sleeve 31.

Figure 6:
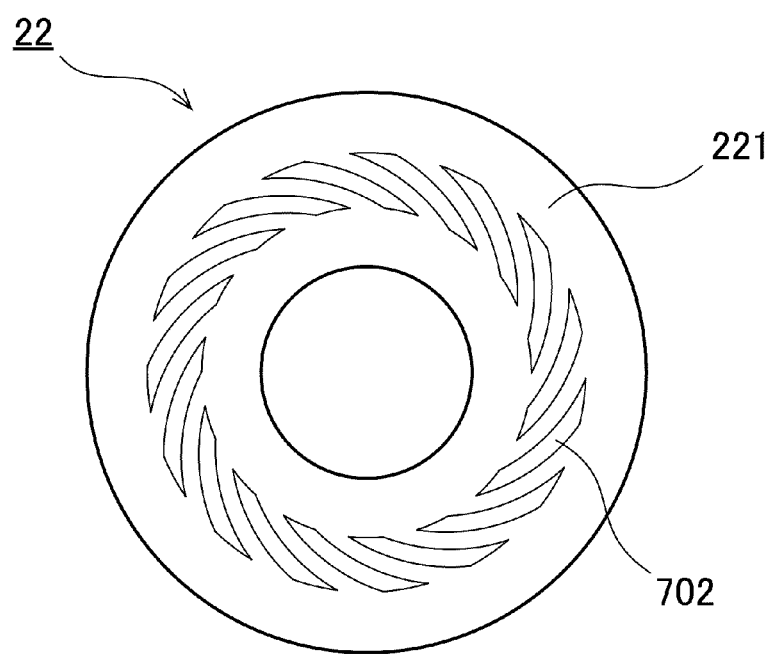
FIG. 6 is a bottom view of a shaft according to the second preferred embodiment of the present invention.
Figure 7:
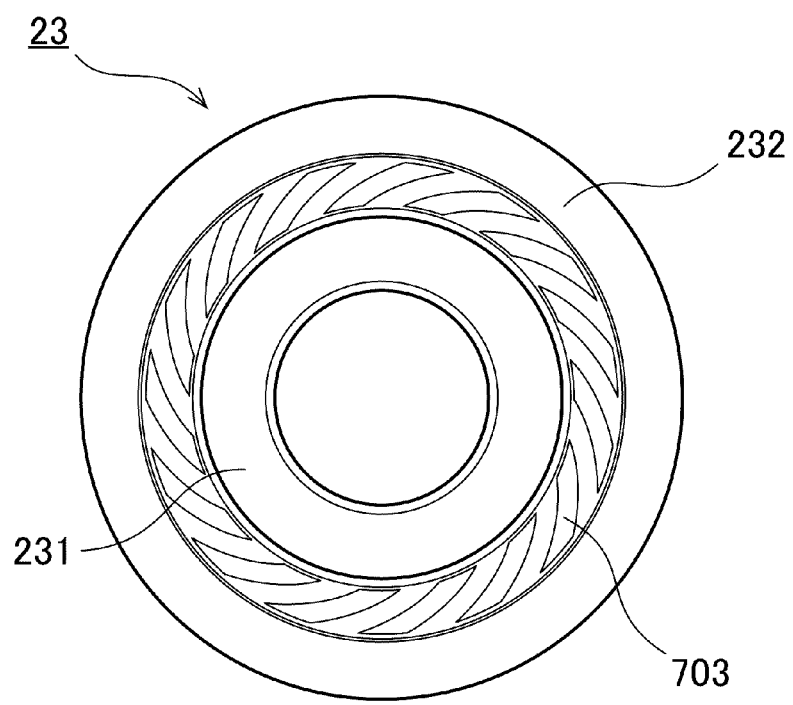
FIG. 7 is a top view of an annular member according to the second preferred embodiment of the present invention.

FIG. 6 is a bottom view of the shaft 22. As illustrated in FIG. 6, a lower surface of the upper annular portion 221 preferably includes a first thrust dynamic pressure groove array 702 arranged in a spiral pattern. FIG. 7 is a top view of the lower annular member 23. As illustrated in FIG. 7, an upper surface of the wall portion 232 preferably includes a second thrust dynamic pressure groove array 703 arranged in a spiral pattern.

The sleeve 31 is arranged to rotate in one direction with respect to the shaft 22 and the lower annular member 23 while the spindle motor 11 is running. At this time, the first thrust dynamic pressure groove array 702 induces a dynamic pressure in a portion of the lubricant oil 70 which is present between the upper annular portion 221 and the annular sleeve portion 311. Meanwhile, the second thrust dynamic pressure groove array 703 induces a dynamic pressure in a portion of the lubricant oil 70 which is present between the wall portion 232 and the annular sleeve portion 311. The sleeve 31 is thus supported axially with respect to the shaft 22 and the lower annular member 23.

Note that it is enough that the first thrust dynamic pressure groove array 702 should be defined in at least one of the lower surface of the upper annular portion 221 and the upper surface of the annular sleeve portion 311. Also note that it is enough that the second thrust dynamic pressure groove array 703 should be defined in at least one of the upper surface of the wall portion 232 and a lower surface of the annular sleeve portion 311. Also note that each of the first and second thrust dynamic pressure groove arrays 702 and 703 according to a modification of the preferred embodiments are a groove array arranged in a herringbone pattern.

As illustrated in FIG. 4, the lubricant oil 70 includes an upper liquid surface 71 and a lower liquid surface 72. The upper liquid surface 71 is preferably located between the outer circumferential surface of the upper annular portion 221 and the inner circumferential surface of the sleeve aid member 32. That is, in the present preferred embodiment, the outer circumferential surface of the upper annular portion 221 and the inner circumferential surface of the sleeve aid member 32 are arranged to together define an upper seal portion 81 arranged to hold the upper liquid surface 71 of the lubricant oil 70. The upper seal portion 81 and the fluid dynamic bearing 7 are connected with each other. In the upper seal portion 81, the radial distance between the outer circumferential surface of the upper annular portion 221 and the inner circumferential surface of the sleeve aid member 32 is arranged to gradually increase with increasing height. The upper liquid surface 71 of the lubricant oil 70 is accordingly attracted downward by surface tension to define a meniscus. A reduction in a leakage of the lubricant oil 70 through the upper seal portion 81 is achieved by arranging the radial width of the upper seal portion 81 to gradually increase with increasing height to cause the upper liquid surface 71 to define the meniscus.

Meanwhile, the lower liquid surface 72 of the lubricant oil 70 is preferably located between the outer circumferential surface of the wall portion 232 of the lower annular member 23 and an inner circumferential surface of the outer tubular portion 313 of the sleeve 31. That is, in the present preferred embodiment, the outer circumferential surface of the wall portion 232 and the inner circumferential surface of the outer tubular portion 313 are arranged to together define a lower seal portion 82 arranged to hold the lower liquid surface 72 of the lubricant oil 70. The lower seal portion 82 and the fluid dynamic bearing 7 are connected with each other. In the lower seal portion 82, the radial distance between the outer circumferential surface of the wall portion 232 and the inner circumferential surface of the outer tubular portion 313 is arranged to gradually increase with decreasing height. The lower liquid surface 72 of the lubricant oil 70 is accordingly attracted upward by surface tension to define a meniscus. A reduction in a leakage of the lubricant oil 70 through the lower seal portion 82 is achieved by arranging the radial width of the lower seal portion 82 to gradually increase with decreasing height to cause the lower liquid surface 72 to define a meniscus.

In addition, the sleeve 31 preferably includes a communicating hole 315 in addition to the central through hole 310. The communicating hole 315 is arranged to pass through the annular sleeve portion 311 in the vertical direction radially outside the central through hole 310. That is, the communicating hole 315 is arranged to join an upper opening 316 defined in the upper surface of the annular sleeve portion 311 and a lower opening 317 defined in the lower surface of the annular sleeve portion 311 to each other in the axial direction. The communicating hole 315 is also filled with the lubricant oil 70.

The lubricant oil 70 is thus arranged to continuously fill a space extending from the upper seal portion 81 to the lower seal portion 82 through a gap between the shaft 22 and the sleeve 31 and the communicating hole 315. Therefore, the lubricant oil 70 includes only the two liquid surfaces, the upper liquid surface 71 held by the upper seal portion 81 and the lower liquid surface 72 held by the lower seal portion 82. This contributes to reducing evaporation of the lubricant oil 70.

Figure 8:
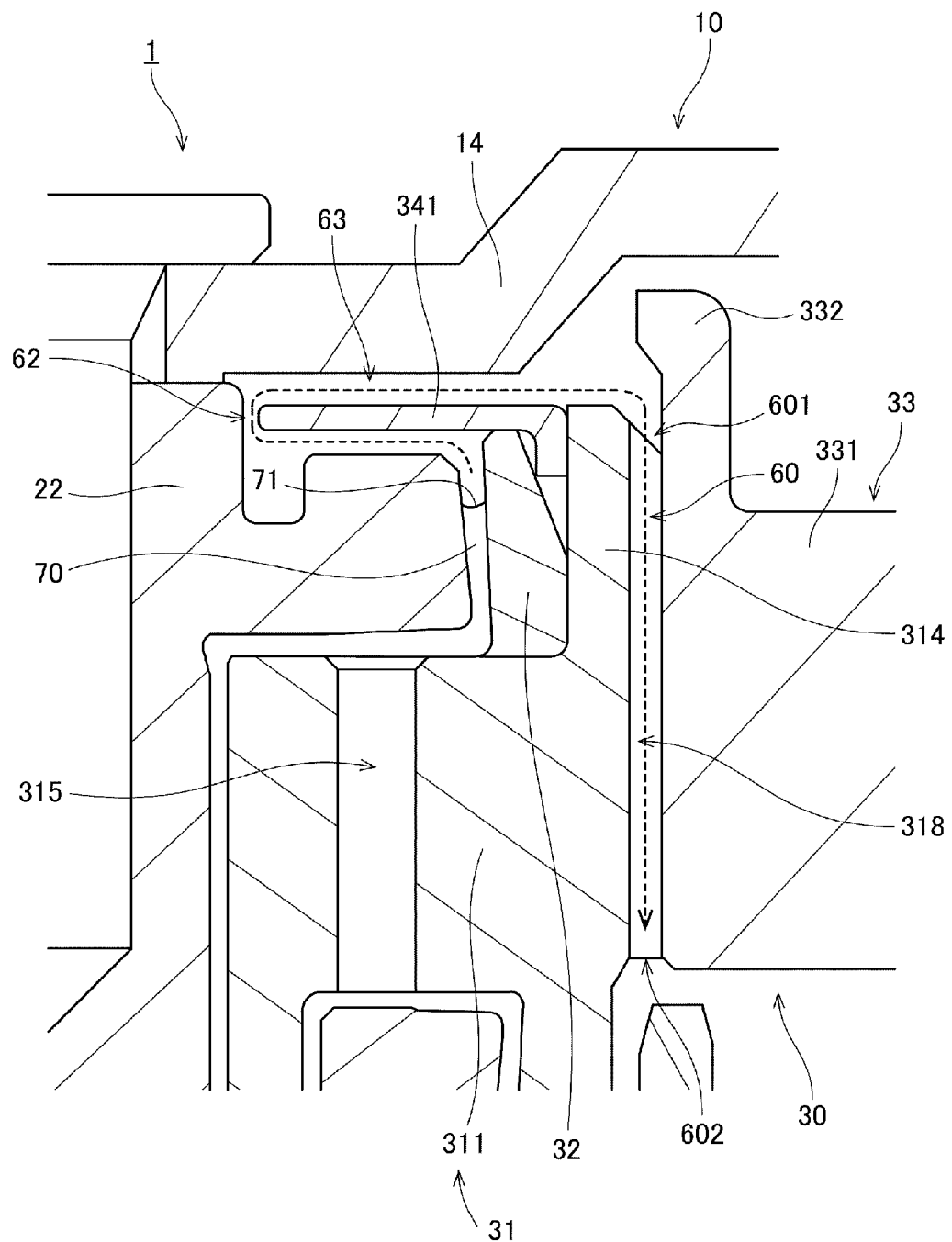
FIG. 8 is a schematic partial cross-sectional view of the disk drive apparatus according to the second preferred embodiment of the present invention.

FIG. 8 is a schematic partial cross-sectional view of the disk drive apparatus 1. The basic structure of the spindle motor illustrated in FIG. 8 is similar to that of the spindle motor illustrated in FIG. 3. As illustrated in FIG. 8, an annular space 63 is arranged to extend around the upper end portion of the shaft 22 inside the case 10. The annular space 63 is arranged to intervene between the top cover 14 and the cap plate portion 341. In addition, the annular space 63 is arranged to extend perpendicularly to the central axis 9. The annular space 63 and the upper liquid surface 71 of the lubricant oil 70 are arranged to be in communication with each other through a space extending along a surface of the cap plate portion 341. Meanwhile, the annular space 63 and the outer circumferential surface 51 of the hub tubular portion 333 are preferably arranged to be in communication with each other through a space extending along a surface of the hub 33. That is, the upper liquid surface 71 of the lubricant oil 70 and the outer circumferential surface 51 of the hub tubular portion 333 are arranged to be in communication with each other through a continuous space including the annular space 63.

In addition, the rotating portion body 30 preferably includes a plurality of air holes 60. Each air hole 60 is arranged to pass through the rotating portion body 30 in the vertical direction. In the present preferred embodiment, each air hole 60 is arranged at a boundary between the sleeve 31 and the hub 33. Specifically, a plurality of grooves 318 each of which extends in the axial direction are defined in an outer circumferential surface of the sleeve 31. The air holes 60 are defined by these grooves 318 and an inner circumferential surface of the hub 33.

Each air hole 60 includes an upper opening 601 defined in an upper surface of the rotating portion body 30, and a lower opening 602 defined in a lower surface of the rotating portion body 30. The upper opening 601 is arranged to be in communication with the annular space 63. Further, as illustrated in FIG. 3, the upper opening 601 is arranged radially outward of the upper liquid surface 71 of the lubricant oil 70 and radially inward of the outer circumferential surface 51 of the hub tubular portion 333. Meanwhile, the lower opening 602 is preferably arranged to be in communication with the gap 61 between the magnet 35 and the teeth 411 through a space between the stator 24 and the top plate portion 331 of the hub 33.

If a gas including the lubricant oil 70 vaporized through the upper liquid surface 71 of the lubricant oil 70 leaks into the annular space 63 through the gap 62 between the cap plate portion 341 and the shaft 22, the gas including the lubricant oil 70 flows radially outward through a centrifugal force which accompanies running of the spindle motor 11. In this spindle motor 11, however, at least a portion of the gas including the lubricant oil 70 flows into each air hole 60 through the upper opening 601 thereof as indicated by a broken-line arrow in FIG. 8. This contributes to preventing the gas including the lubricant oil 70 from diffusing radially outwardly of the air hole 60. This in turn contributes to preventing a component of the lubricant oil 70 included in the gas from being adhered to a surface of any magnetic disk 12.

In particular, in the present preferred embodiment, the length of a communicating path from the lower opening 602 of each air hole 60 to each magnetic disk 12 preferably is greater than the length of a communicating path from the upper opening 601 of the air hole 60 to the magnetic disk 12. In addition, a channel in a space extending from the lower opening 602 of the air hole 60 to the magnetic disk 12 is narrowed by the base plate 21. Accordingly, a gas including the lubricant oil 70 discharged downward from the lower opening 602 of the air hole 60 is prevented from reaching the magnetic disk 12, or a considerable time is required for the gas to reach the magnetic disk 12. Moreover, each of the stator 24 and the magnet 35 is arranged at an axial level lower than an axial level of a lower end of the air hole 60. Accordingly, the gas including the lubricant oil 70 discharged downward from the lower opening 602 of the air hole 60 tends to easily stay in a region on this side of the stator 24 and the magnet 35 due to presence of the stator 24 and the magnet 35. This contributes to further reducing the amount of a gas which includes the lubricant oil 70 and which flows from the lower opening 602 toward the magnetic disk 12.

Figure 9:
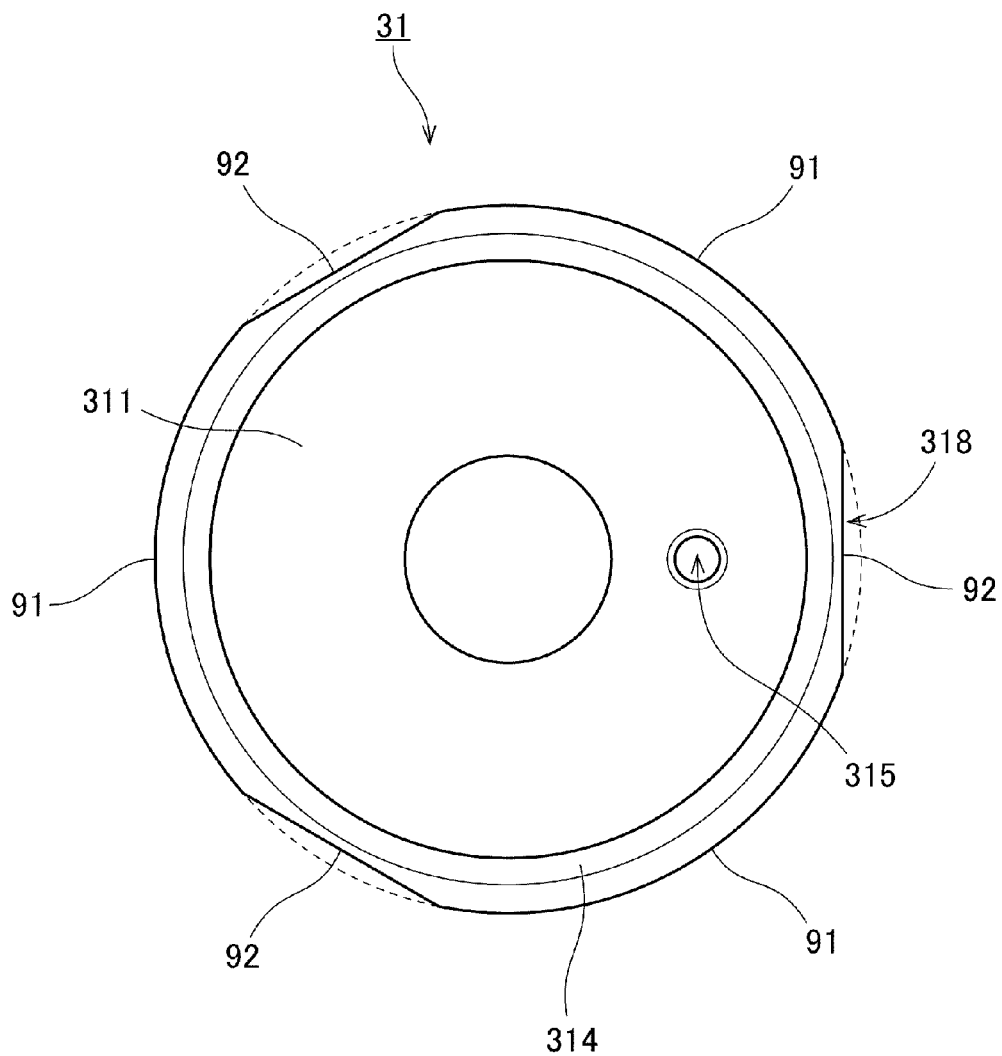
FIG. 9 is a top view of the sleeve according to the second preferred embodiment of the present invention.

FIG. 9 is a top view of the sleeve 31. As illustrated in FIG. 9, in the present preferred embodiment, outer circumferential surfaces of the annular sleeve portion 311 and the upper tubular portion 314 preferably include three first surfaces 91 and three second surfaces 92. The first surfaces 91 and the second surfaces 92 are arranged alternately in the circumferential direction. Each first surface 91 is a surface arranged in the shape of a circular arc centered on the central axis 9 in a plan view. Each second surface 92 is a flat surface arranged to join adjacent circumferential edges of the first surfaces 91 to each other. The air holes 60 are defined between the inner circumferential surface of the hub 33 and the grooves 318 defined by the second surfaces 92. The grooves 318 and the air holes 60 are easily obtained by providing the flat second surfaces 92 in the outer circumferential surface of the sleeve 31.

Figure 10:
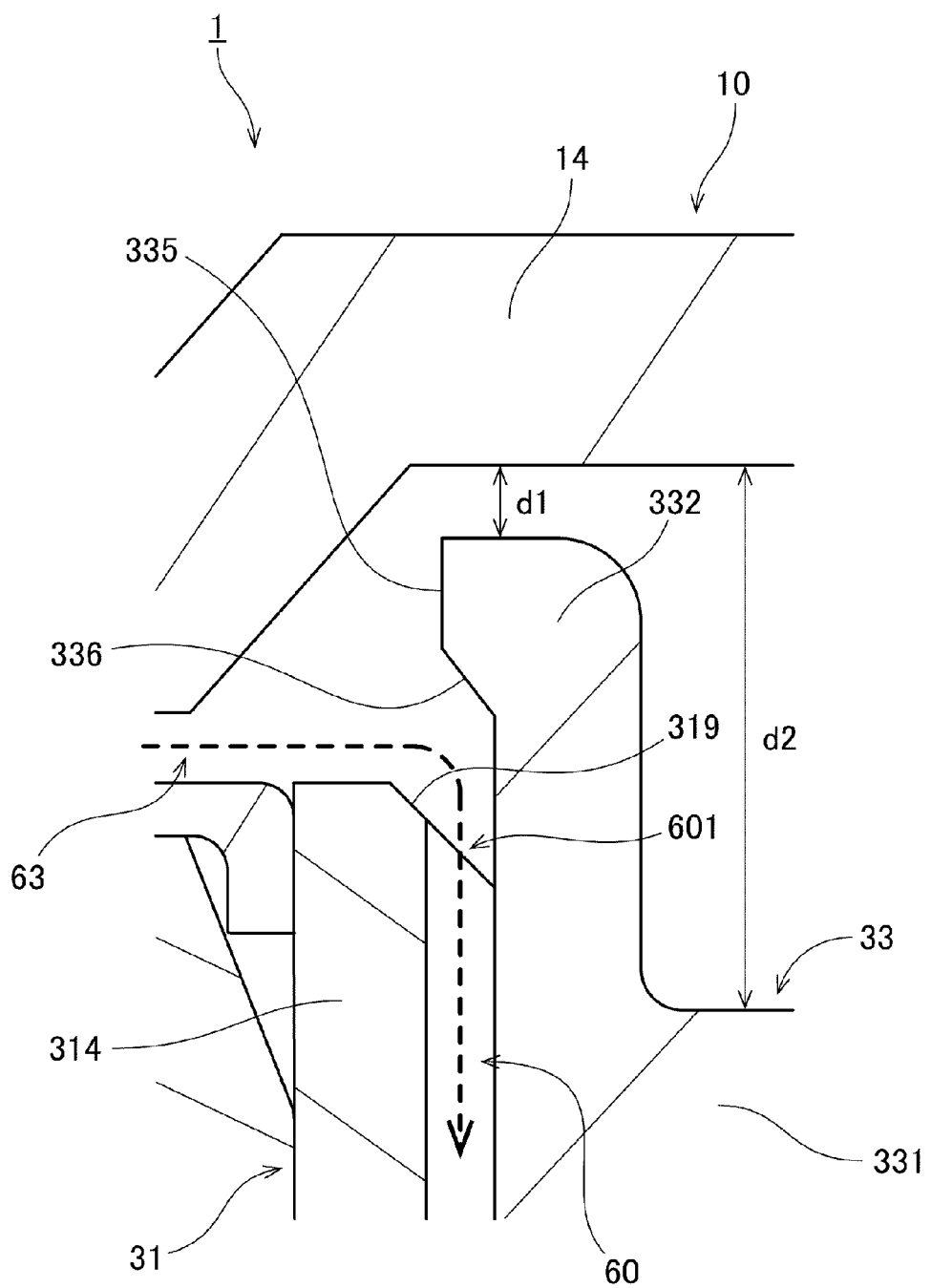
FIG. 10 is a schematic partial cross-sectional view of the disk drive apparatus according to the second preferred embodiment of the present invention.

FIG. 10 is a schematic partial cross-sectional view of the disk drive apparatus 1, illustrating the upper opening 601 of the air hole 60 and its vicinity. As illustrated in FIG. 10, the hub 33 according to the present preferred embodiment preferably includes the projecting portion 332, which is cylindrical or substantially cylindrical. The projecting portion 332 is arranged to project upward from the radially inner end portion of the top plate portion 331. Accordingly, an axial distance d1 between an upper end portion of the projecting portion 332 and a lower surface of the top cover 14 is shorter than an axial distance d2 between an upper surface of the top plate portion 331 and the lower surface of the top cover 14. This contributes to preventing the gas including the lubricant oil 70 from diffusing radially outwardly of the projecting portion 332.

In addition, the projecting portion 332 includes an inner circumferential surface 335 arranged above the upper opening 601 of each air hole 60 and radially inward of a radially outer edge of the upper opening 601 of each air hole 60. Accordingly, the gas including the lubricant oil 70 and diffusing radially outward from the annular space 63 is guided by the projecting portion 332 into each air hole 60 as indicated by a broken-line arrow in FIG. 10. This contributes to further reducing the amount of the gas including the lubricant oil 70 and flowing toward the magnetic disk 12.

Although the projecting portion 332 according to the present preferred embodiment is defined integrally with the hub 33, a modification of the present preferred embodiment of the projecting portion 332 is defined separately from the hub 33. For example, a separate member in the shape of the projecting portion may be fixed to the upper surface of the top plate portion 331 through, for example, adhesion or welding. Further, an inside surface of a clamp arranged to fix the disks 12 may be arranged as the projecting portion in the vicinity of the upper opening 601 of each air hole 60.

Furthermore, as illustrated in FIG. 10, the hub 33 according to the present preferred embodiment preferably includes a first slanting surface 336. The first slanting surface 336 is arranged to extend downward and radially outward from a lower end portion of the inner circumferential surface 335 of the projecting portion 332. The radial distance between the first slanting surface 336 and the central axis 9 is arranged to gradually increase with decreasing height. Accordingly, the gas including the lubricant oil 70 and diffusing radially outward from the annular space 63 is guided into each air hole 60 along the first slanting surface 336. This contributes to further reducing the amount of the gas including the lubricant oil 70 and flowing toward the magnetic disk 12.

Furthermore, the sleeve 31 according to the present preferred embodiment preferably includes a second slanting surface 319. The second slanting surface 319 is arranged to diagonally join an upper surface of the upper tubular portion 314 and an upper end portion of a radially inner edge of each air hole 60 to each other. In addition, the radial distance between the second slanting surface 319 and the central axis 9 is arranged to gradually increase with decreasing height. Accordingly, the gas including the lubricant oil 70 and diffusing radially outward from the annular space 63 is guided into the air hole 60 along the second slanting surface 319. Moreover, the second slanting surface 319 increases the area of an opening in the vicinity of the upper opening 601 of the air hole 60. This contributes to further reducing the amount of the gas including the lubricant oil 70 and flowing toward the magnetic disk 12.

While preferred embodiments of the present invention have been described above, it is to be understood that the present invention is not limited to the above-described preferred embodiments.

Figure 11:
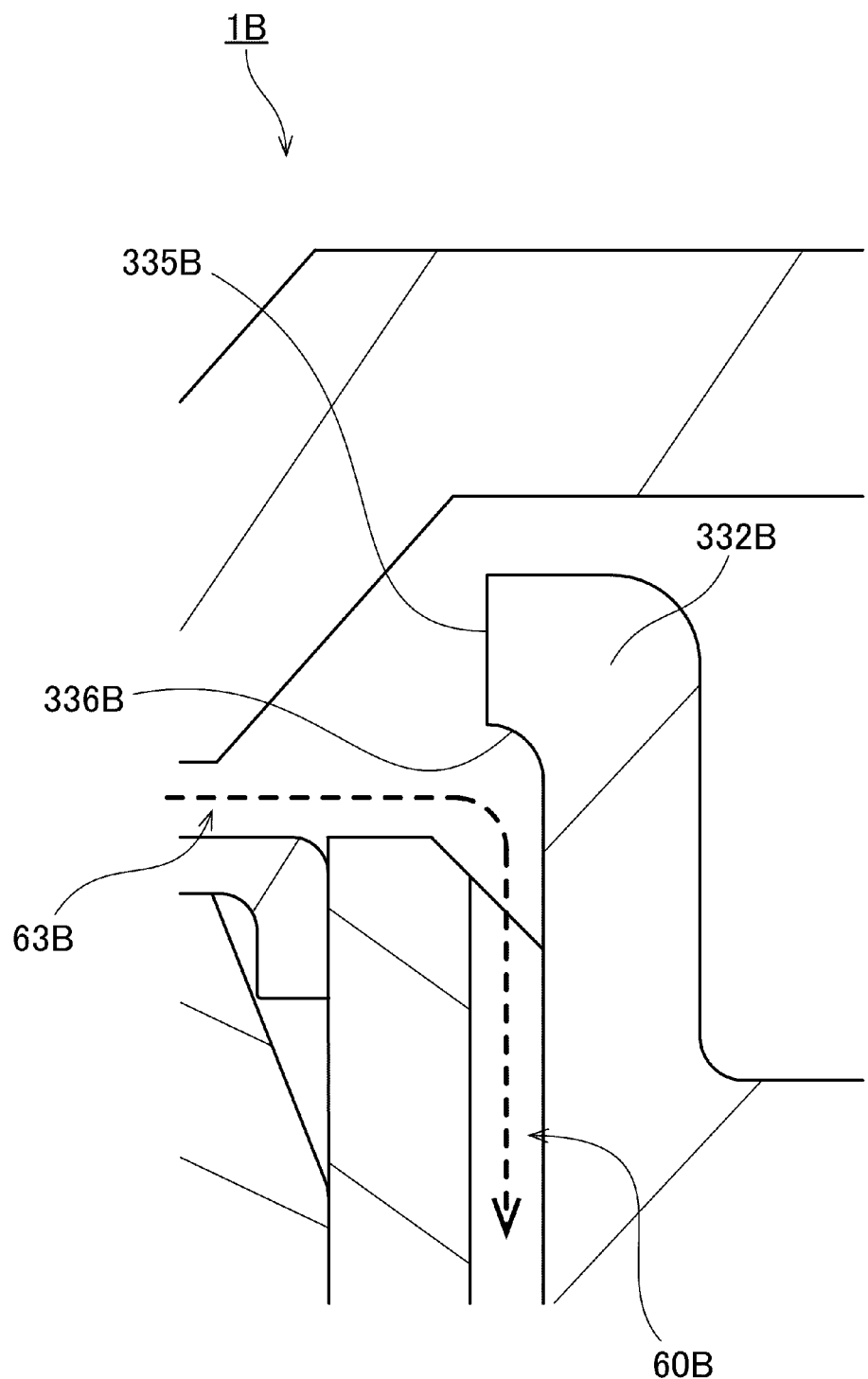
FIG. 11 is a schematic partial cross-sectional view of a disk drive apparatus according to an example modification of the second preferred embodiment of the present invention.

FIG. 11 is a schematic partial cross-sectional view of a disk drive apparatus 1B according to an example modification of the second preferred embodiment. In the example modification illustrated in FIG. 11, a first slanting surface 336B is preferably in the shape of a circular arc in a section including a central axis. The first slanting surface 336B is preferably arranged to extend radially outward from a lower end portion of an inner circumferential surface 335B of a projecting portion 332B, and to gradually approach parallelism with the central axis with increasing distance from the central axis. Also in this example modification, the radial distance between the first slanting surface 336B and the central axis is arranged to gradually increase with decreasing height. Accordingly, a gas including a lubricant oil and diffusing radially outward from an annular space 63B is guided into an air hole 60B along the first slanting surface 336B. This contributes to reducing the amount of a gas including the lubricant oil and flowing toward a magnetic disk.

Figure 12:
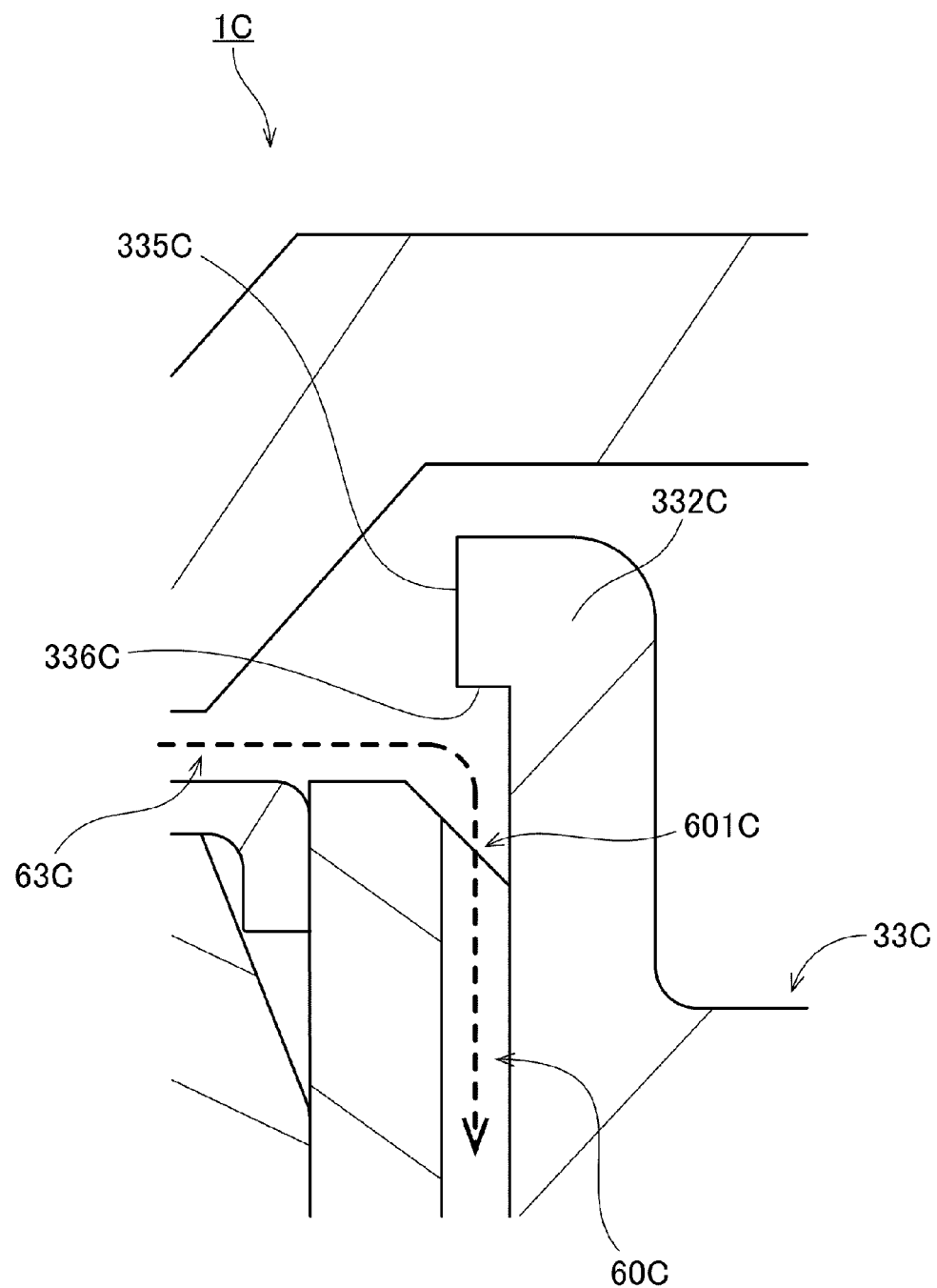
FIG. 12 is a schematic partial cross-sectional view of a disk drive apparatus according to an example modification of the second preferred embodiment of the present invention.

FIG. 12 is a schematic partial cross-sectional view of a disk drive apparatus 1C according to another example modification of the second preferred embodiment. A hub 33C illustrated in FIG. 12 preferably includes a shoulder surface 336C in place of the first slanting surface. The shoulder surface 336C is arranged to extend radially outward from a lower end portion of an inner circumferential surface 335C of a projecting portion 332C. In addition, at least a portion of the shoulder surface 336C is preferably arranged to axially overlap with an upper opening 601C of an air hole 60C. In this example modification, a gas including a lubricant oil and diffusing radially outward from an annular space 63C is first gathered in a space under the shoulder surface 336C and then flows into the air hole 60C. This contributes to reducing the amount of a gas including the lubricant oil and flowing toward a magnetic disk.

Figure 13:
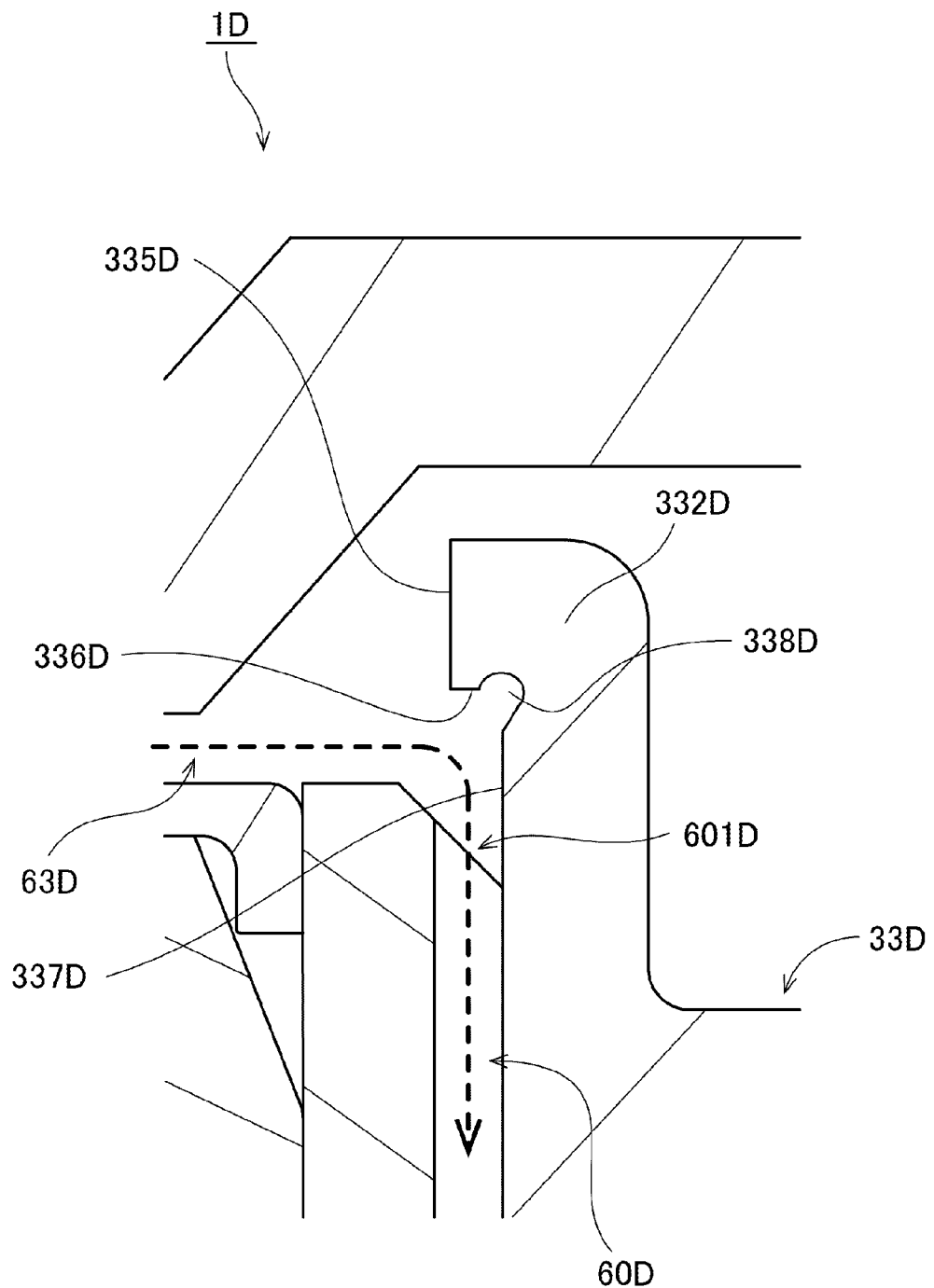
FIG. 13 is a schematic partial cross-sectional view of a disk drive apparatus according to an example modification of the second preferred embodiment of the present invention.

FIG. 13 is a schematic partial cross-sectional view of a disk drive apparatus 1D according to another example modification of the second preferred embodiment. A projecting portion 332D illustrated in FIG. 13 preferably includes an annular recessed portion 338D recessed axially and radially. A shoulder surface 336D is arranged to extend radially outward from a lower end portion of an inner circumferential surface 335D of the projecting portion 332D. A rotating portion includes a wall surface 337D. In this example modification, the wall surface 337D is included in a hub 33D. The wall surface 337D is arranged radially outward of the shoulder surface 336D, and is arranged to extend in the axial direction. The distance between a central axis and the wall surface 337D is preferably arranged to be equal to the distance between the central axis and an inner circumferential surface of the hub 33D. The annular recessed portion 338D, which is recessed axially upward and radially outward, is arranged at a junction of the shoulder surface 336D and the wall surface 337D. Note that the annular recessed portion 338D of the preferred embodiments preferably is recessed only either axially upward or radially outward. The annular recessed portion 338D of the present preferred embodiments preferably is recessed both axially upward and radially outward. In this example modification, a gas including a lubricant oil and diffusing radially outward from an annular space 63D is gathered in a space of the annular recessed portion 338D, and a swirl is generated in the space of the annular recessed portion 338D. Generation of the swirl allows the gas to stay in the space of the annular recessed portion 338D, and facilitates a flow of the gas into an upper opening 601D of an air hole 60D. This contributes to reducing the amount of a gas including the lubricant oil and flowing toward a magnetic disk. Note that the hub 33D and a sleeve 31 according to a modification of the present preferred embodiments are preferably defined by a single continuous monolithic member.

Figure 14:
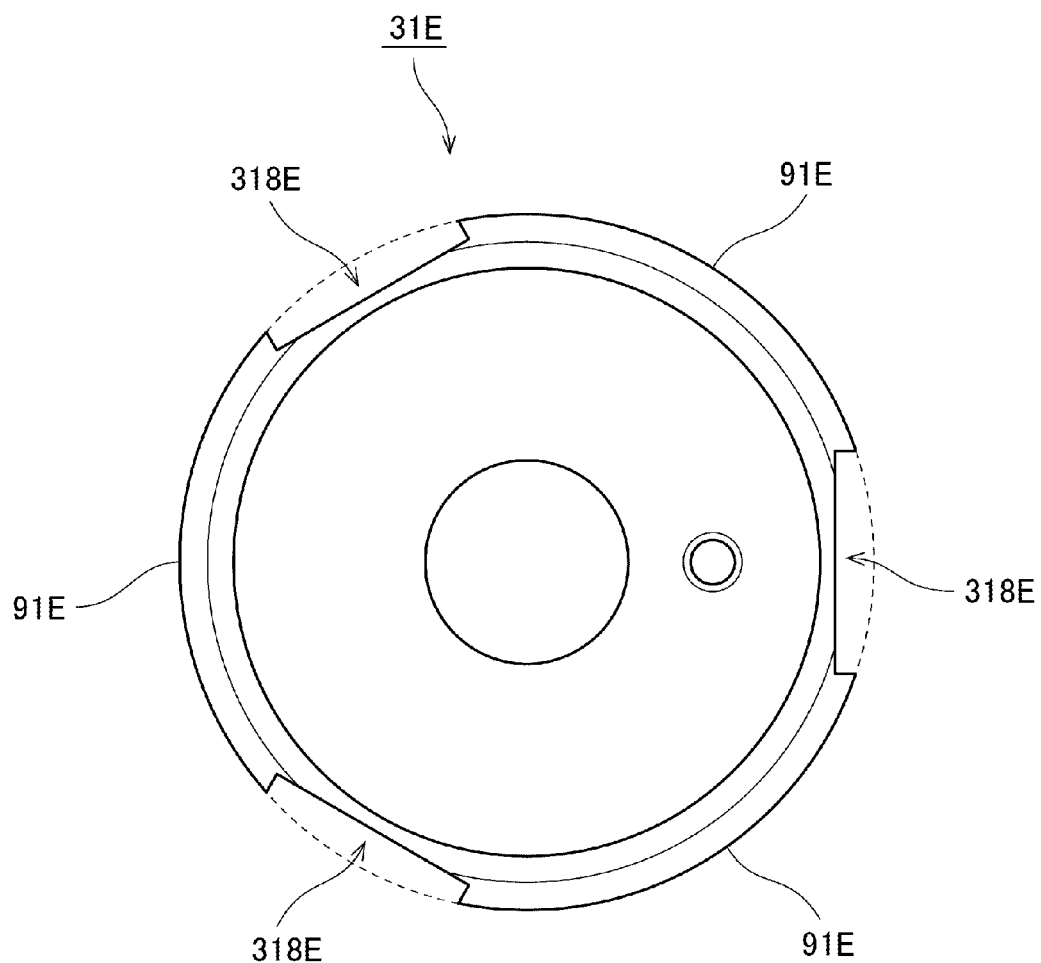
FIG. 14 is a top view of a sleeve according to an example modification of the second preferred embodiment of the present invention.

FIG. 14 is a top view of a sleeve 31E according to another example modification of the second preferred embodiment. In the example modification illustrated in FIG. 14, an outer circumferential surface of the sleeve 31E preferably includes three rectangular grooves 318E in place of the three second surfaces. Each groove 318E is arranged to extend in the axial direction. In addition, first surfaces 91E and the grooves 318E are arranged alternately in the circumferential direction. Even the above arrangement allows air holes to be defined between the grooves 318E and an inner circumferential surface of a hub.

Figure 15:
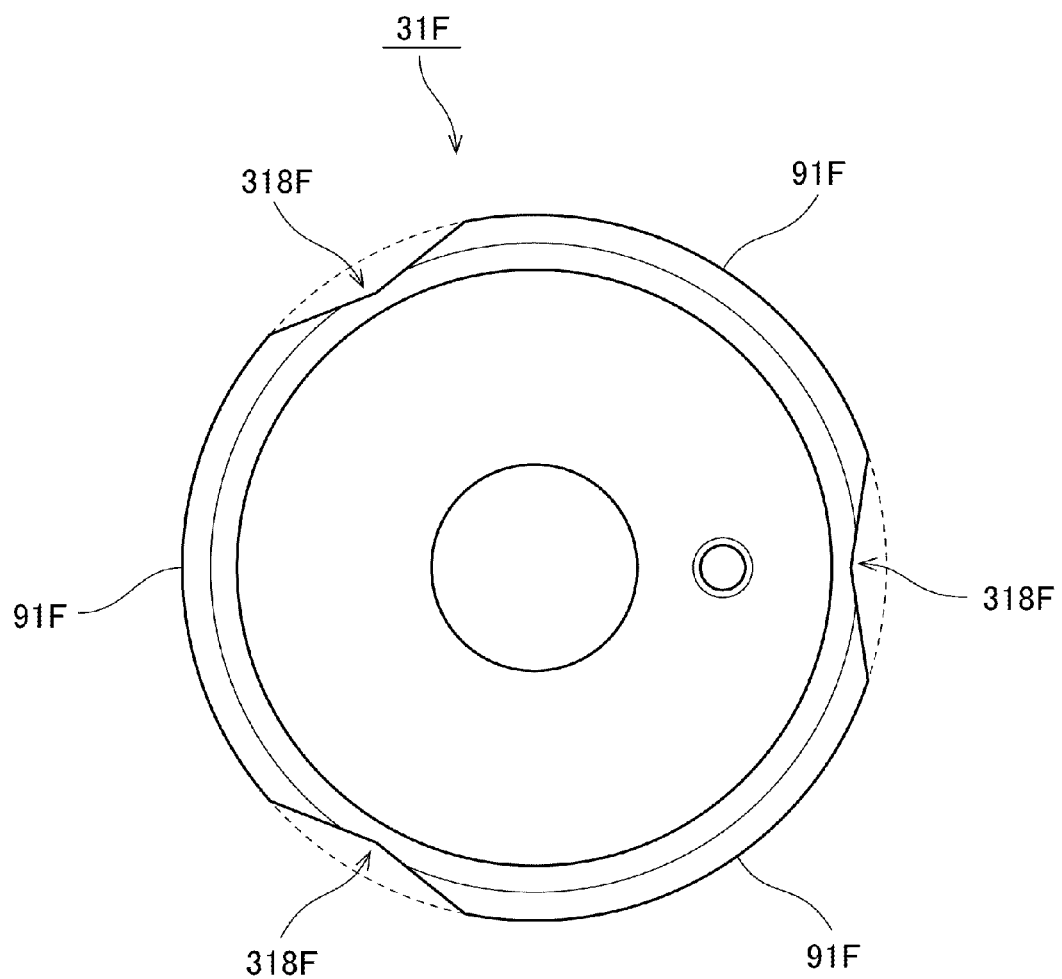
FIG. 15 is a top view of a sleeve according to an example modification of the second preferred embodiment of the present invention.

FIG. 15 is a top view of a sleeve 31F according to another example modification of the second preferred embodiment. In the example modification illustrated in FIG. 15, an outer circumferential surface of the sleeve 31F preferably includes three V-shaped grooves 318F in place of the three second surfaces. Each groove 318F is arranged to extend in the axial direction. In addition, first surfaces 91F and the grooves 318F are arranged alternately in the circumferential direction. Even the above arrangement allows air holes to be defined between the grooves 318F and an inner circumferential surface of a hub.

Figure 16:
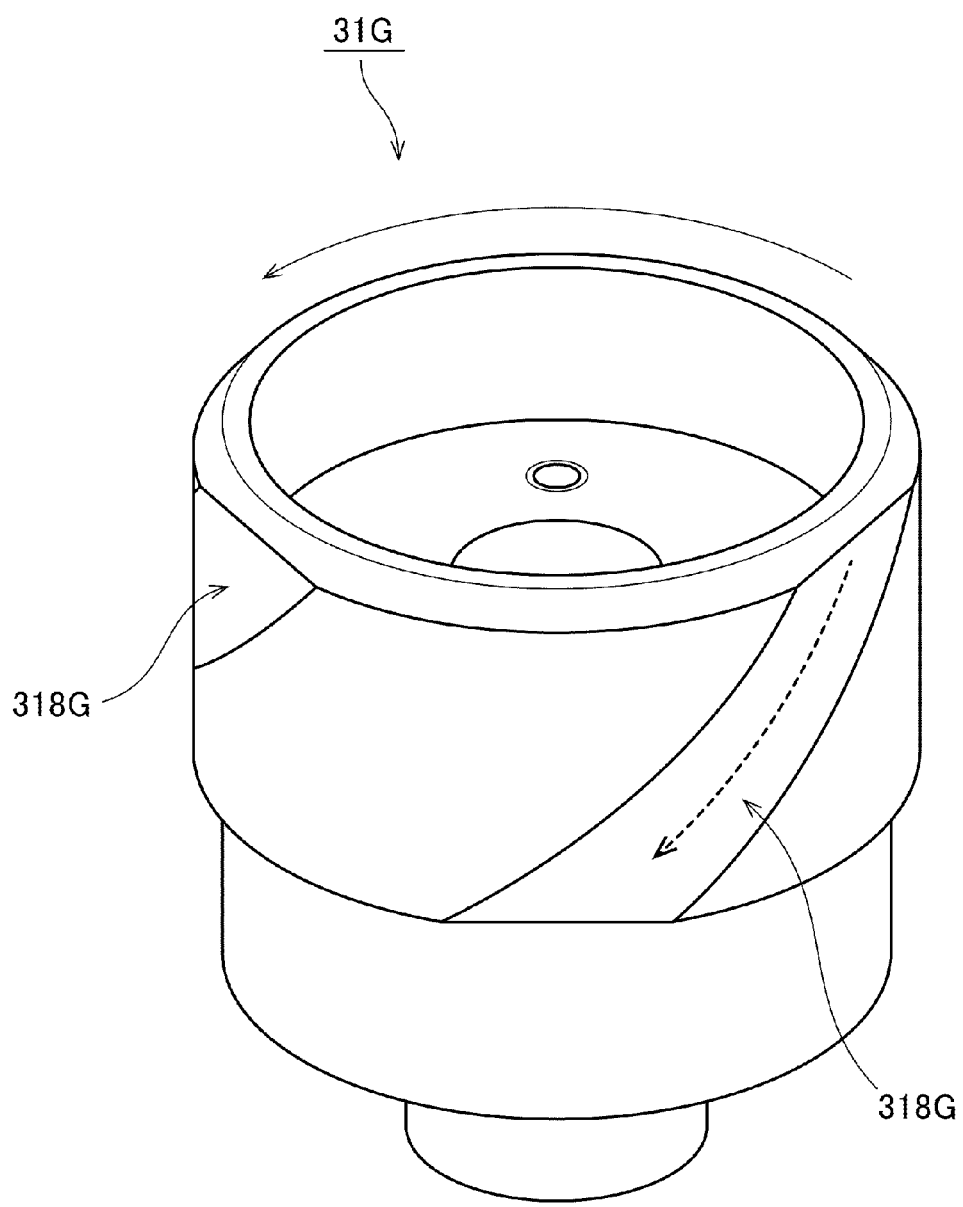
FIG. 16 is a perspective view of a sleeve according to an example modification of the second preferred embodiment of the present invention.

FIG. 16 is a perspective view of a sleeve 31G according to another example modification of the second preferred embodiment. In the example modification illustrated in FIG. 16, an outer circumferential surface of the sleeve 31G preferably includes a plurality of spiral grooves 318G. This arrangement causes spiral air holes to be defined between the grooves 318G and an inner circumferential surface of a hub. That is, a circumferential position of each air hole shifts in one direction as the air hole extends from an upper opening thereof downward. Accordingly, when a rotating portion is caused to rotate in such a manner that a lower opening of the air hole moves in the direction of the upper opening thereof as indicated by a solid line arrow in FIG. 16, an air current traveling from the upper opening toward the lower opening is generated in the air hole as indicated by a broken-line arrow in FIG. 16. This air current enables a gas including a lubricant oil to be actively taken into the air hole through the upper opening thereof. This contributes to reducing the amount of a gas including the lubricant oil and flowing from an annular space toward a magnetic disk.

Figure 17:
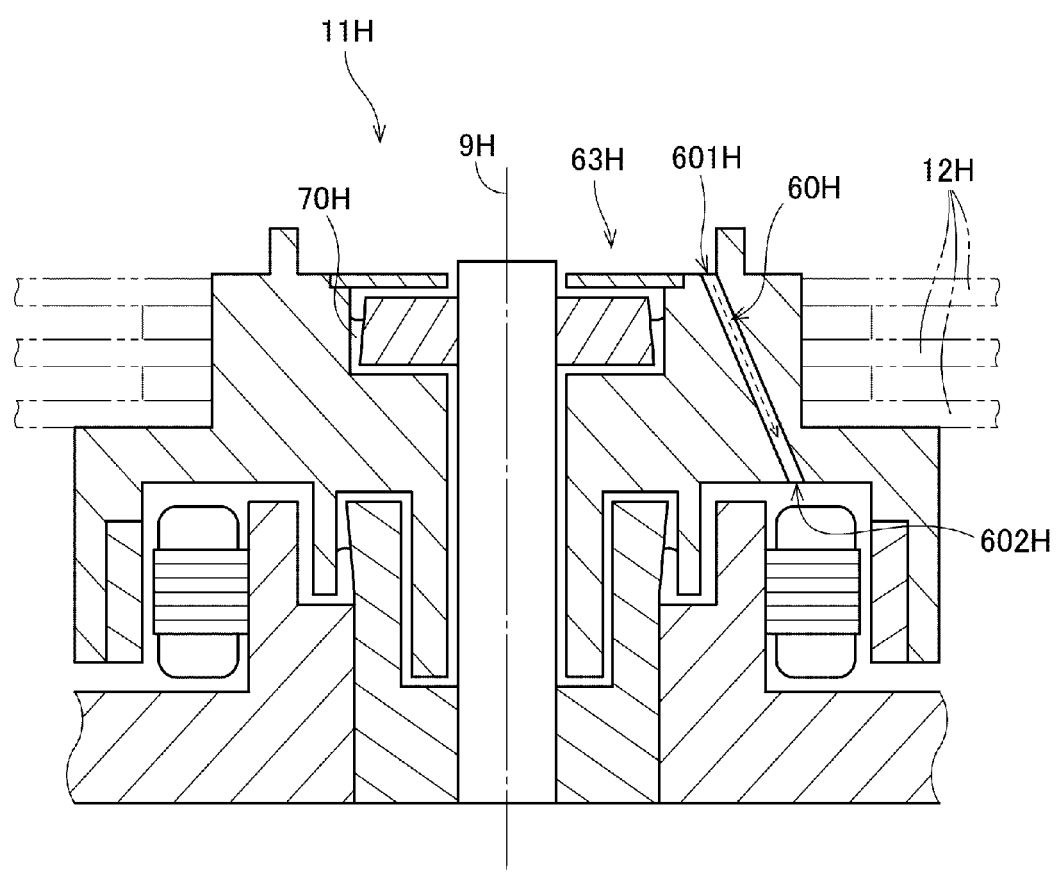
FIG. 17 is a schematic cross-sectional view of a spindle motor according to an example modification of the second preferred embodiment of the present invention.

FIG. 17 is a schematic cross-sectional view of a spindle motor 11H according to another example modification of the second preferred embodiment. In the example modification illustrated in FIG. 17, an air hole 60H is preferably arranged to extend obliquely with respect to a central axis 9H. Specifically, the radial distance between the central axis 9H and the air hole 60H is arranged to gradually increase with decreasing height. This arrangement enables a gas including a lubricant oil 70H to be actively taken into the air hole 60H through a centrifugal force which is caused when the spindle motor 11H is running. This contributes to reducing the amount of a gas including the lubricant oil 70H and flowing from an annular space 63H toward a magnetic disk 12H.

Note that the air hole 60H may not necessarily be inclined in its entirety to enable the gas including the lubricant oil 70H to be taken into the air hole 60H through the centrifugal force. For example, only a portion of the air hole 60H may be arranged to extend obliquely with respect to the central axis 9H, so that a lower opening 602H of the air hole 60H is arranged radially outward of an upper opening 601H thereof.

Also note that, according to another example modification of the second preferred embodiment, an air hole is defined by a groove defined in an inner circumferential surface of a hub and an outer circumferential surface of a sleeve. Also note that, although the number of air holes 60 included in the spindle motor 11 according to the above-described second preferred embodiment is preferably three, a modification of the present preferred embodiments of the number of air holes includes any number of air holes including one, two, or more than three, for example.

Also note that, although the magnet 35 is arranged radially outside the stator 24 according to the above-described preferred embodiment, a magnet is arranged radially inside a stator according to another preferred embodiment of the present invention. That is, an outer circumferential surface of the magnet and a radially inner end surface of each of a plurality of teeth is arranged radially opposite each other with a gap intervening therebetween. Also note that, although the stator 24 and the magnet 35 are arranged radially opposite each other with the gap intervening therebetween according to the above-described preferred embodiments, a spindle motor according to another preferred embodiment of the present invention is structured such that a stator and a magnet are arranged axially opposite each other with a gap intervening therebetween.

Also note that spindle motors according to other preferred embodiments of the present invention include motors arranged to rotate disks other than the magnetic disks, such as optical disks.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention is applicable to spindle motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus configured to rotate a disk including a circular hole at a center thereof in a case including a base plate and a top cover arranged to cover an upper side of the base plate, the spindle motor comprising:
    a stationary portion;
    a rotating portion configured to be rotatable about a central axis extending in a vertical direction;
    a fluid dynamic bearing including a lubricant oil, and arranged to support the rotating portion; and
    a seal portion connected with the fluid dynamic bearing, and including a liquid surface of the lubricant oil located therein; wherein
    the stationary portion includes:
        a shaft extending along the central axis; and
        a stator including a plurality of coils having an annular or substantially annular shape with the central axis as a center;
    the rotating portion includes:
        a rotating portion body including a central through hole in which at least a portion of the shaft is accommodated; and
        a magnet opposite to the stator with a gap intervening therebetween;
    the rotating portion body includes:
        a cylindrical first disk support surface located within the circular hole of the disk; and
        a disk-shaped second disk support surface extending radially outward from the first disk support surface, and configured to have the disk mounted thereon;
    an annular space is intervening between the top cover and the rotating portion body inside the case;
    the annular space is in communication with both the first disk support surface and the liquid surface;
    the rotating portion body further includes at least one air hole including an upper opening in communication with the annular space, and a lower opening in communication with the gap; and
    the upper opening is located radially outward of the liquid surface and radially inward of the first disk support surface.

2. The spindle motor according to claim 1, wherein
    the rotating portion body includes:
        a tubular sleeve including the central through hole; and
        a hub separate from the sleeve, and located radially outward of the sleeve;
    the hub includes the first disk support surface and the second disk support surface; and
    each of the at least one air hole is located at a boundary between the sleeve and the hub.

3. The spindle motor according to claim 2, wherein
    an outer circumferential surface of the sleeve includes:
        at least one first surface having a shape of a circular or substantially circular arc centered on the central axis in a plan view; and
        at least one second surface recessed radially inward relative to the at least one first surface; and
    each of the at least one air hole is defined by a separate one of the at least one second surface and an inner circumferential surface of the hub.

4. The spindle motor according to claim 3, wherein each of the at least one second surface is a flat surface configured to join adjacent circumferential edges of the at least one first surface to each other.

5. The spindle motor according to claim 2, wherein
    the hub includes a tubular projecting portion projecting upward from a position radially outward of the upper opening; and
    the projecting portion includes an inner circumferential surface located above the upper opening and radially inward of a radially outer edge of the upper opening.

6. The spindle motor according to claim 1, wherein
    the rotating portion body includes a tubular projecting portion projecting upward from a position radially outward of the upper opening; and
    the projecting portion includes an inner circumferential surface located above the upper opening and radially inward of a radially outer edge of the upper opening.

7. The spindle motor according to claim 6, wherein the projecting portion further includes a first slanting surface extending downward and radially outward from a lower end portion of the inner circumferential surface, a distance between the first slanting surface and the central axis configured to gradually increase with decreasing height.

8. The spindle motor according to claim 6, wherein
    the projecting portion further includes a shoulder surface extending radially outward from a lower end portion of the inner circumferential surface of the projecting portion; and
    at least a portion of the shoulder surface is arranged to axially overlap with the upper opening.

9. The spindle motor according to claim 6, wherein
    the projecting portion further includes a shoulder surface extending radially outward from a lower end portion of the inner circumferential surface of the projecting portion;
    the rotating portion further includes a wall surface arranged radially outward of the shoulder surface, and extending in an axial direction;
    an annular recessed portion recessed at least either axially upward or radially outward is located at a junction of the shoulder surface and the wall surface; and
    at least a portion of the shoulder surface is arranged to axially overlap with the upper opening.

10. The spindle motor according to claim 1, wherein
    the rotating portion body further includes a second slanting surface configured to join an upper surface of the rotating portion body and an upper end portion of a radially inner edge of each of the at least one air hole to each other; and
    a distance between the second slanting surface and the central axis is configured to gradually increase with decreasing height.

11. The spindle motor according to claim 1, wherein a circumferential position of each of the at least one air hole is configured to shift in one direction as the air hole extends downward from the upper opening thereof.

12. The spindle motor according to claim 1, wherein
a distance between at least a portion of each of the at least one air hole and the central axis is configured to gradually increase with decreasing height; and
the lower opening is located radially outward of the upper opening.

13. The spindle motor according to claim 1, wherein a length of a communicating path from the lower opening to the disk is greater than a length of a communicating path from the upper opening to the disk.

14. The spindle motor according to claim 1, wherein
each of the stator and the magnet is located at an axial level lower than an axial level of a lower end of each of the at least one air hole;
the stator includes:
a stator core including a plurality of teeth arranged in a circumferential direction; and
the coils being defined by a collection of conducting wires wound around the plurality of teeth; and
a radially outer end surface of each of the plurality of teeth and a radially inner surface of the magnet are radially opposite to each other with a slight gap intervening therebetween.

15. The spindle motor according to claim 1, wherein the stationary portion further includes the base plate extending perpendicularly or substantially perpendicularly to the central axis below the stator, the rotating portion body, and the magnet.

16. A disk drive apparatus comprising:
the spindle motor of claim 1;
an access portion configured to perform at least one of reading and writing of information from or to the disk, the disk being supported by the rotating portion of the spindle motor; and
the top cover; wherein
both the rotating portion and the access portion are accommodated in the case.

* * * * *